United States Patent [19]

Stanley

[11] 4,410,820

[45] Oct. 18, 1983

[54] AXIAL FLUX ELECTRIC MACHINE

[75] Inventor: Louis Stanley, Peakhurst, Australia

[73] Assignee: Card-O-Matic Pty. Ltd., Australia

[21] Appl. No.: 286,505

[22] Filed: Jul. 24, 1981

[30] Foreign Application Priority Data

Jul. 29, 1980 [AU] Australia ............................... PE4753
Nov. 11, 1980 [AU] Australia ............................... PE6426

[51] Int. Cl.³ .............................................. H02K 1/00
[52] U.S. Cl. ...................................... 310/216; 310/268
[58] Field of Search .......................... 310/268, 216–218

[56] References Cited

U.S. PATENT DOCUMENTS

| 1,897,184 | 2/1933 | Zopp | 310/268 X |
| 2,245,577 | 6/1941 | Dieckman | 310/268 X |
| 2,490,021 | 12/1949 | Aske | 310/268 UX |
| 2,557,249 | 6/1951 | Aske | 310/268 X |
| 2,734,140 | 2/1956 | Parker | 310/268 |
| 3,581,389 | 6/1971 | Mori et al. | 310/268 X |

Primary Examiner—Donovan F. Duggan
Attorney, Agent, or Firm—Townsend and Townsend

[57] ABSTRACT

A core for an axial flux induction electric machine, the core being formed of metal strip wound about a central axis with the strip being punched to have a plurality of holes which are spaced longitudinally of the strip and aligned on the core to form radially extending slots.

7 Claims, 9 Drawing Figures

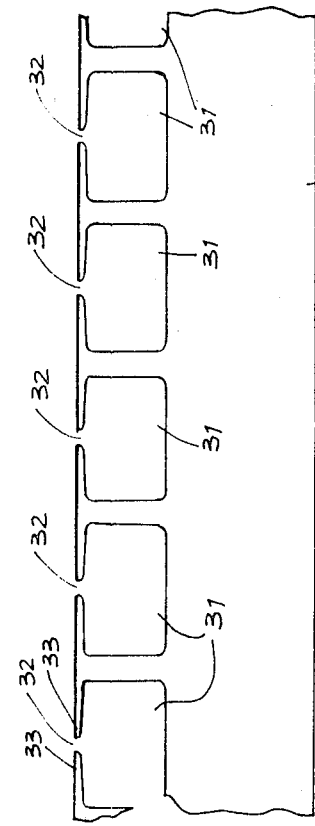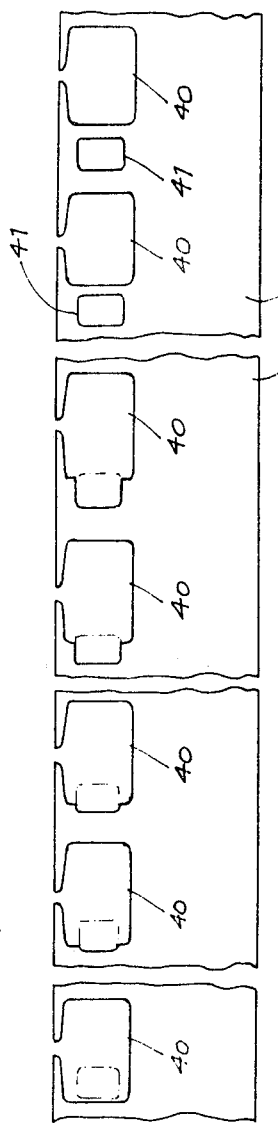

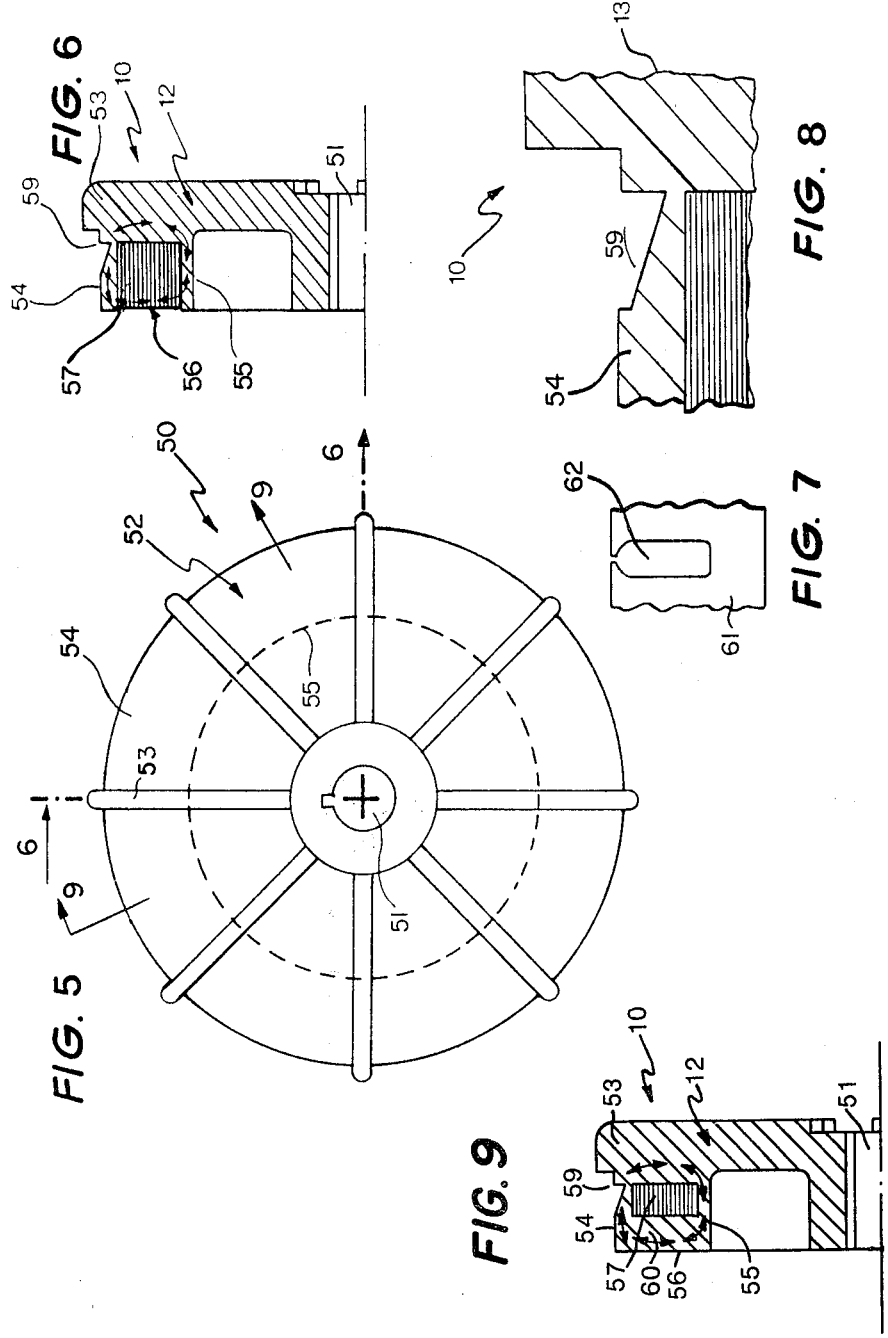

AXIAL FLUX ELECTRIC MACHINE

The present invention relates to the construction of electric motors and more particularly but not exclusively to parallel flux induction motors and the rotors therefor.

As described in Australian Patent application No. 51842/79 it is possible to form the rotor of a parallel flux induction motor from punched metal strip, with the holes punched in the strip being aligned to form radially extending slots on the core of the rotor.

The use of axial flux induction electric motors has generally been limited to situations that do not require the motor to have a relatively large starting or stalling torque, since it has been a problem of axial flux electric motors that they do not have good low speed torque characteristics.

It is an object of the present invention to overcome or substantially ameliorate the above disadvantages.

It has been found advantageous in the forming of rotors for axial parallel flux induction motors, that the slots in the rotor should be radially outwardly diverging, and more preferably that the slots are divided by a projection having a generally constant width. It has also been found advantageous to have the slots formed so that each slot consists of a main slot which branches at a radially outwardly spaced location from the inner peripheral surface of the rotor, into one or more secondary slots. Still further it has been found advantageous that the slots at the location at which they are exposed to the end face of the rotor are defined by two metal projections which taper toward each other so as to inhibit the leakage of flux.

There is disclosed herein a rotor core for an axial flux induction electric machine, said core being formed of metal strip wound about a central axis, said strip being punched to have a first set of holes which are spaced longitudinally of the strip so as to form a first set of radially extending slots when located on the core, and wherein said slots have side walls which diverge radially outwardly so that the angular area of both slots increases radially outwardly.

There is further disclosed herein a rotor for an axial flux electric motor, said rotor comprising a generally annular core formed of metal strip punched with holes and wound about a central axis, said holes being longitudinally spaced along the strip so as to form radially extending slots in the core, flux conduit rings extending along the radially outer and inner longitudinal peripheral surfaces of said core, first flux conduit bars extending through said slots and conductively linking said rings, and further flux conduit bars also linking said rings but joined thereto at a longitudinally spaced location relative to the first conductive bars so that said core is substantially located between the first and further bars, and flux resistance means adapted to inhibit the passage of flux in a loop extending around said core via said bars and rings.

There is still further disclosed herein a core for an axial flux electric machine, said core being formed of metal strip having holes punched therein and wound about a central axis, said holes being spaced at longitudinally spaced locations so as to form radially extending grooves in the core, said holes having a main slot forming portion extending to the strip edge via a slot neck portion, and wherein said neck portion is defined between two projections which taper in transverse width toward said neck portion.

A preferred form of the present invention will now be described by way of example with reference to the accompanying drawings, wherein:

FIG. 3 is a segment of a metal strip which may be wound to form the core of a rotor of a parallel flux induction electric machine;

FIG. 4 is a segment of a strip which may be wound to form the core of a rotor for a parallel flux induction electric machine;

FIG. 5 is an end elevation of a rotor of an axial flux induction electric motor;

FIG. 6 is a schematic side elevation of the rotor of FIG. 1 sectioned along the lines 6—6;

FIG. 7 is an enlarged section view of a portion of the rotor as illustrated in FIG. 6; and FIG. 8 schematically depicts a portion of the punched strip used to form the core of the rotor of FIG. 1 and FIG. 9 is an enlarged section view of a portion of the rotor of FIG. 5, and is taken on line 9—9 of FIG. 5.

Figure 1:
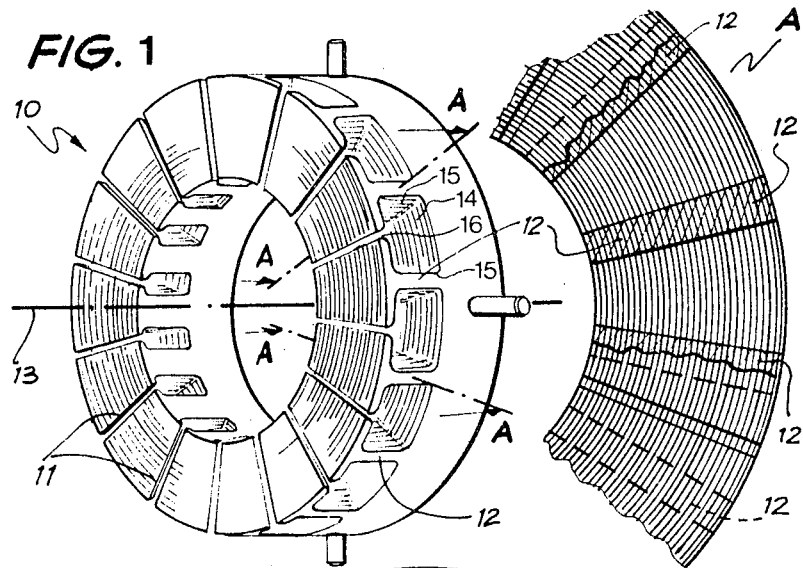
FIG. 1 is a schematic perspective view of a core of a rotor of a parallel flux induction electric machine.

Firstly with reference to FIG. 1, there is depicted the core 10 which may be used to form the rotor of an axial parallel flux induction electric motor, which core is formed of punched metal strip. The strip is wound about the axis 13 with the holes in the punched strip being radially aligned so as to form the slots 11. The slots 11 are separated by projections 12. In this particular embodiment the slots 11, as more clearly seen in insert A are formed so as to increase in cross-sectional area radially outwardly so that the cross-sectional area of the slot adjacent the axis 13 is smaller than the cross-section of the slot at a radially outwardly spaced location. It is still further preferred that the projections 12 have a substantially constant cross-section.

The slots 11 have a base surface 14, two side surfaces 15 and a neck portion 16. Accordingly, in order for the area of the slot 11 to increase, the side surfaces 15 of each individual slot must diverge outwardly from the axis 13. However, adjacent side surfaces 15 of adjacent slots are generally parallel so as to maintain the cross-sectional area of the projections 12 generally constant.

Figure 2:
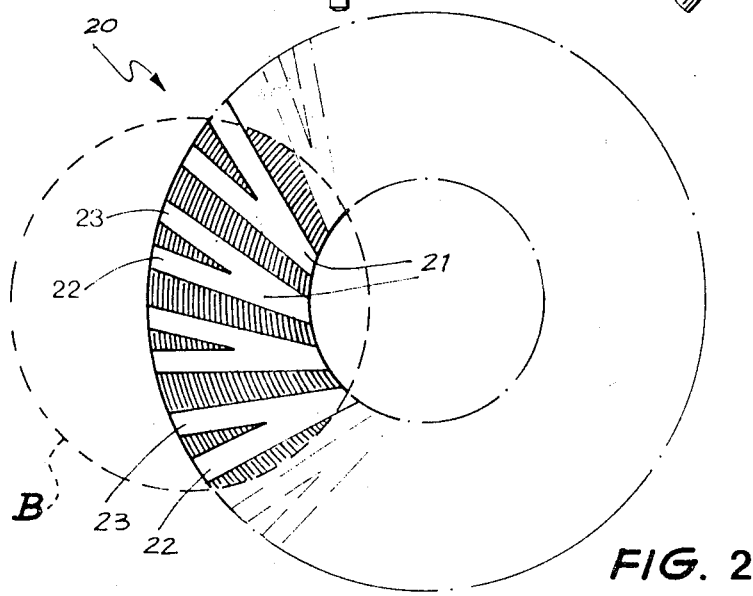
FIG. 2 is a plan view of the core of a rotor for a parallel flux induction electric machine.

Now with reference to FIG. 2, there is depicted a core 20 which may be used to form the rotor of an axial parallel flux induction electric machine. The rotor 20 is formed of punched metal strip which is wound about the central axis of the core 20, with the holes punched in the strip being radially aligned to form radially extending slots as illustrated in the insert B. The slots consist of main slots 21 which divide to form secondary slots 22 and 23.

In both the above described embodiments of FIGS. 1 and 2, the slots may be formed by the interaction of two punches which co-operate with the feed rate of the strip to form the desired slot cross section, e.g. as can more easily be seen with reference to FIG. 4, each slot 40 is formed by the operation of two punches. As the feed rate of the strip 43 increases, one of the punches which initially did not engage the strip, but pass through the aperture formed by the first punch, begins to engage the strip, and therefore change the cross-sectional area of the slot to be formed. As the feed rate further increases the second punch forms a second slot 41. In the formation of either core 10 or 20, the feed rate of the strip being wound increases as the diameter of the core being formed increases.

Now with reference to FIG. 3, there is illustrated a punched metal strip 30 which may be wound to form the core of the rotor of an axial parallel flux induction electric machine. The strip 30 has punched holes 31 which have a neck aperture 32. Each aperture 32 is defined by two projections 33 which taper towards the aperture 32 so that the thickness of each projection in the plane of the strip adjacent the aperture 32 is of the order of 0.020 to 0.030 inches. Additionally, the extremities of the projections 33 may be spaced from 0.010 and 0.060 inches. The tapering of projections 33 increases the resistance to the passage of flux across the aperture 32.

In FIGS. 5 to 9 there is depicted a rotor 50 having a central passage 51 to receive a shaft, and a casing 52 which has an outer peripheral ring 54 and an inner ring 55 joined by radially extending flux conducting bars 53. The bars 53 are located on the axially outer end face of the rotor while on the axially inner face 56 the rings 54 and 55 are also joined by further radially extending flux conductive bars 60. These further bars 60 are located in the radially extending slots in the core 57. The casing 52 encompasses the rotor core 57. The casing 52 encompasses a rotor core 57, which core 57 is formed of punched metal strip 61 wound about the axis of the rotor so that the punched holes 62 in the strip 61 form radially extending grooves in the core adjacent the face 56 through which bars 60 in that face extend. In practise the field produced by the stator and which passes through the laminated structure of the core 57 and the two sets of bars induces a current in the casing 52 which roughly follows the path indicated by the arrows 58. To increase the torque of this electric motor, the current induced in the casing 52 is provided with a resistance by means of the groove 59 machined in the radially outer peripheral ring 54.

Now with reference also to FIG. 8 wherein there is depicted a portion of the strip which is wound to form the core 57. As can be seen, the strip portion includes a punched hole 58 which is aligned with other holes to form radially extending grooves in the face 56 within which the radially extending bars are formed. It is preferred that the area of the hole 58 be equal to or less than the longitudinal cross-sectional area of the outer peripheral ring 54.

Although the formation of the groove 59 influences the starting torque of the motor, it should further be appreciated that by forming the groove 59, the overall speed and smoothness of operation of the motor is also altered. As an example, as the size of the groove 59 is increased, the speed of the motor is correspondingly decreased together with the smoothness of operation of the motor. Accordingly the motor characteristics can to some extent be predetermined by the formation of a groove 59 of a particular configuration.

What I claim is:

1. A rotor core for an axial flux induction electric machine, said core being formed of metal strip wound about a central axis, said strip being punched to have a first set of holes which are spaced longitudinally of the strip so as to form a first set of radially extending slots when located on the core, and wherein said slots have side walls which diverge radially outwardly so that the angular area of the slots increases radially outwardly.

2. The core of claim 1 wherein said slots are separated by radially extending projections defined between the adjacent side walls of adjacent slots, and wherein said projections have a substantially constant angular cross-section.

3. The core of claim 1 wherein said strip is punched to form a second set of radially extending slots which are located radially outwardly of the first set of slots, and wherein said second set of slots are arranged in pairs with the slots of each pair converging radially inwardly to form said first set of slots.

4. A rotor for an axial flux electric motor, said rotor comprising a generally annular core formed of metal strip punched with holes and wound about a central axis, said holes being longitudinally spaced along the strip so as to form radially extending slots on the core, flux conduit rings extending along the radially outer and inner longitudinal peripheral surfaces of said core, first flux conductive bars extending through said slots and conductively linking said rings, and further flux conductive bars also linking said rings but joined thereto at a longitudinally spaced location relative to the first conductive bars so that said core is substantially located between the first and further bars, and flux resistance means adapted to inhibit the passage of flux in a loop extending around said core via said bars and rings.

5. The rotor of claim 4 wherein said resistance means is an annular groove formed in one of said rings.

6. The rotor of claim 5 wherein said groove is formed in said outer rings.

7. A core for an axial flux electric machine, said core being formed of metal strip having holes punched therein and wound about a central axis, said holes being spaced at longitudinally spaced locations so as to form radially extending grooves in the core, said holes having a first slot forming portion extending to the strip edge via a slot neck portion, and wherein each neck portion is defined between two projections which each taper so as to have a transverse width decreasing toward said neck portion.

* * * * *